United States Patent
Lindgren

(10) Patent No.: US 10,653,118 B2
(45) Date of Patent: May 19, 2020

(54) COANDA EFFECT FISH PUMP

(71) Applicant: Peter B. Lindgren, Pompano Beach, FL (US)

(72) Inventor: Peter B. Lindgren, Pompano Beach, FL (US)

( * ) Notice: Subject to any disclaimer, the term of this patent is extended or adjusted under 35 U.S.C. 154(b) by 0 days.

(21) Appl. No.: 16/382,385

(22) Filed: Apr. 12, 2019

(65) Prior Publication Data

US 2019/0313610 A1    Oct. 17, 2019

Related U.S. Application Data

(60) Provisional application No. 62/657,049, filed on Apr. 13, 2018.

(51) Int. Cl.
| | |
|---|---|
| *A01K 61/13* | (2017.01) |
| *F04F 5/46* | (2006.01) |
| *F04F 5/10* | (2006.01) |
| *A01K 63/04* | (2006.01) |

(52) U.S. Cl.
CPC ............ *A01K 61/13* (2017.01); *A01K 63/047* (2013.01); *F04F 5/10* (2013.01); *F04F 5/46* (2013.01)

(58) Field of Classification Search
USPC ................ 119/200–203, 216, 213; 417/197
See application file for complete search history.

(56) References Cited

U.S. PATENT DOCUMENTS

| | | | |
|---|---|---|---|
| 2,040,890 A * | 5/1936 | Wrentmore | E02F 3/902 417/197 |
| 2,052,869 A | 9/1936 | Coanda | |
| 3,655,298 A | 4/1972 | Baker | |
| 3,664,768 A | 5/1972 | Mays et al. | |
| 3,795,367 A | 3/1974 | Mocarski | |
| 4,155,682 A | 5/1979 | Hillis | |
| 4,193,737 A | 3/1980 | Lemmon | |
| 4,487,553 A | 12/1984 | Nagata | |
| 4,519,423 A * | 5/1985 | Ho | B01F 5/045 137/888 |
| 4,702,676 A | 10/1987 | Westfall et al. | |
| 4,743,742 A | 5/1988 | Espedalen | |
| 5,018,946 A | 5/1991 | Breckner et al. | |
| 5,403,522 A * | 4/1995 | Von Berg | B01F 3/0876 261/36.1 |
| 5,664,733 A * | 9/1997 | Lott | B01F 5/02 239/429 |

(Continued)

FOREIGN PATENT DOCUMENTS

| | | |
|---|---|---|
| CA | 2098229 | 12/1994 |
| EP | 3114926 | 1/2017 |

(Continued)

*Primary Examiner* — Andrea M Valenti
(74) *Attorney, Agent, or Firm* — McHale & Slavin, P.A.

(57) ABSTRACT

An improved Coanda effect fish pump that allows for improved pump performance with enhanced and unsymmetrical-irregularities features in circumferential flow gaps and orifice flutes that improve water flow distribution and pump performance. Design features improve fish quality during pumping and can be designed to remove sea lice from salmon. The features reduce spinning in the pump, correct for unsymmetrical input water pressure distribution, and reshape water velocities to more effectively remove sea lice.

5 Claims, 5 Drawing Sheets

(56) References Cited

U.S. PATENT DOCUMENTS

| | | | | |
|---|---|---|---|---|
| 5,992,763 | A * | 11/1999 | Smith | E21B 10/61 |
| | | | | 239/428.5 |
| 6,880,485 | B2 | 4/2005 | Massey et al. | |
| 7,111,975 | B2 * | 9/2006 | Fenton | F04F 5/24 |
| | | | | 137/889 |
| 7,462,016 | B2 * | 12/2008 | Lindgren | A01K 79/00 |
| | | | | 417/197 |
| 2017/0172114 | A1 | 6/2017 | Halse | |
| 2017/0325432 | A1 | 11/2017 | Halse et al. | |
| 2018/0153142 | A1 | 6/2018 | Hansen | |
| 2018/0160657 | A1 | 6/2018 | Lindgren | |
| 2018/0206458 | A1 | 7/2018 | Lindgren | |

FOREIGN PATENT DOCUMENTS

| | | |
|---|---|---|
| GB | 2042641 | 9/1980 |
| JP | 2010172238 | 8/2010 |
| NO | 301440 | 10/1997 |
| WO | WO9727744 | 8/1997 |
| WO | WO9824304 | 6/1998 |
| WO | WO9941976 | 8/1999 |
| WO | WO2005124032 | 12/2005 |
| WO | WO2010087722 | 8/2010 |
| WO | WO2011099865 | 8/2011 |
| WO | WO2012148283 | 11/2012 |
| WO | WO2014184766 | 11/2014 |
| WO | WO2015043603 | 4/2015 |
| WO | WO2016189146 | 12/2016 |

* cited by examiner

COANDA EFFECT FISH PUMP

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/657,049, entitled "Improved Coanda Effect Fish Pump", filed Apr. 13, 2018. The contents of the above referenced application are incorporated herein by reference.

FIELD OF THE INVENTION

This invention relates to the fishing industry and, more particularly, to fish pumps capable of moving a liquid containing fish or other fragile organisms.

BACKGROUND OF THE INVENTION

Adult sea lice attach to salmon by hooking on the scales of the fish, by attaching a filament, or by suction. Sea lice develop through several life stages. The most concerning stage is adult and sub adult stages wherein sea lice are mobile and seeking attachment. Once attached, the sea lice are capable of surviving forward motion of the fish. As fish naturally swim upstream against a current, the sea lice are positioned to remain attached to the fish.

A velocity differential between the fish and water can be used to remove sea lice. In this manner, sea lice are readily removed when the water velocity is reversed, namely flowing from the tail of the fish toward the head of the fish.

In some locations, government regulations require minimum sea lice concentrations. If sea lice concentrations are too high, fish stocks must be harvested immediately. The result is a monetary loss to the farmer due to the lower value of small fish and higher per kilogram cost.

The minimum sea lice removal from fish stock, to control sea lice concentrations, must be over 90% or repopulation of the sea lice rapidly occurs. The removal of the sea lice must also reduce or eliminate damage to the fish.

Fish pumps used to transfer fish commonly use a suction which causes the fish to enter the fish pump tail first. Since the natural tendency of a fish is to move against a current, the fish enter a fish pump swimming away from the suction flow, thereby entering an intake line tail first. Fish that enter a fish pump, or other current producing device, receive a predictable velocity gradient from head to tail and the hooked on lice stay hooked. Test results indicate that for salmon entering water streams of 0.3 to 1 ft/sec from head to tail reflect almost no sea lice removal.

Spinning and turbulence is a problem when pumping live fish. When the fish is pumped for sea lice removal, the fish must be returned for continued growth after processing. Minimizing injury to the fish is critical to avoid bleeding gills or lost slime and scale which commonly result in fish mortalities.

Coanda effect pumps are known for their beneficial use in pumping fish. A problem for known Coandas effect pumps is that the flutes are very shallow or no flutes exist. Also the designs inherently have a high pressure at the primary water entrance impacting the inner tube and opposite 180 where the high velocity water meets and velocity becomes pressure.

Another problem with conventional Coanda pumps is the sudden turbulence or swirl due to the differential energy in the circumferential primary flow and the inner column of induced flow. Large active fish can be severely injured at this junction, wherein scales and fins can be torn off or side wall impact so severe that the fish can be killed.

Spinning or undesirable water velocities cause the fish to struggle in the flow pipes and often damage themselves loosing scales and slime that protect them from disease. The current invention solves both of these problems with larger flutes and changing depths to stop spinning and balance or alter pressure distribution for ideal water flow to eliminate fish damage.

Patents relevant to this industry include Coanda, U.S. Pat. No. 2,052,869, which describes the original pump, now referred to as the Coanda effect pump.

Baker, U.S. Pat. No. 3,655,298, includes circumference water injection at an angle, but does not use a cone or Coanda effect.

Mays, U.S. Pat. No. 3,664,768, discloses a jet pump improved with succession of radially inwardly stepped wall segments, numbers 380, 80, of said tubular housing.

Mocarski, U.S. Pat. No. 3,795,367, discloses a Coanda effect device that mixes the primary and secondary flow with discharge flow.

Hillis, U.S. Pat. No. 4,155,682, discloses a pump including an upstream and downstream high pressure nozzle with different inclined angles of entry in a jet pump to improve efficiency by reducing turbulence and boundary layer.

Westfall, U.S. Pat. No. 4,702,676, discloses a pump with multiple nozzles similar to the Hillis U.S. Pat. No. 4,155,682, with claim 2 including pressurized gas.

Nagata, U.S. Pat. No. 4,487,553, discloses a series of circumferentially spaced nozzles. This disclosure does not use a Coanda effect pump to reduce the turbulence and cavitation required for moving fish without damage.

Halse, U.S. Patent Publication No. US2017/0325432, discloses a pumping system that includes a vacuum pump, valves and buffer pipe to recycle water while pumping fish.

Breckner, U.S. Pat. No. 5,018,946, discloses an early Coanda effect pump. The Coanda effect is the property of a fluid to follow a curved surface, see. Breckner, which describes a pump using uniform surface in the Coanda surfaces.

Lillerud, WO 2014/184766, discloses an improvement of sea lice cleaning with gas bubbles.

Hansen, WO 2016/189146, comprises a cylinder with holes and water injection at both ends to scrape sea lice from fish. It is not a pump with Coanda effect.

There are various ways to get fish entered head first, including the system set forth by Lindgren in Patent Publication application U.S. 2018/0206458) and the use of special pumps, as in Lemmon, U.S. Pat. No. 4,193,737.

Lindgren, U.S. Pat. No. 7,462,016, discloses an improved fish lift for processing larger fish on larger boats. Lindgren is a modified Coanda effect pump to improve lift. This patent was designed to improve the capacity of the early Coanda effect fish pump, and included flutes in the interior water injection flow path to more efficiently effect the far field of water flow, and therefore, improves lift and flow capacity. The Lindgren pump, marketed under the mark SILKSTREAM™, passes approximately 21% of the flow through the flutes. It has been found that the Lindgren pump will remove up to 70% of sea lice (*Lepeophtheirus salmonis*) from salmon.

In particular, the SILKSTREAM™ pump enters water through a tube concentrically at a high velocity on a curved cone surface to create inlet suction. For example, a 10 inch pump commonly used on salmon fish requires approximately 2,000 GPM for a 2 meter lift. The inlet water with fish will be approximately 1,500 GPM. The water stream tube surface will triple velocity in less than 4 inches. The SILKSTREAM™ pump has been found to be exceptionally beneficial in the removal of sea lice when the fish is drawn through the pump head first.

What is needed in the art is an improved pump that is directed to increasing the removal of sea lice, while reducing or eliminating damage to fish during transfer. The improved pump is focused on fish welfare, and can process the fish fast, effectively, and efficiently with minimal stress.

SUMMARY OF THE INVENTION

The invention includes improvements to a Coanda effect fish pump that allows for improved pump performance with enhanced and unsymmetrical features in the circumferential flow gap and orifice flutes that improves water flow distribution and pump performance. Its design features improve fish quality during pumping and remove sea ice from salmon. The features reduce spinning in the pump, correct for unsymmetrical input water pressure distribution, and reshape water velocities for improved pump performance to more effectively remove sea lice.

An objective of the invention is to teach a Coanda effect pump for moving fish having more than fifteen (15) flutes having unsymmetrical shapes in the Coanda circumferential flow gap for increasing the removal of sea lice.

Another objective of the invention is to teach a Coanda effect pump where the flutes are not all the same width or depth.

Still another objective of the invention is to teach a Coanda effect pump where the circumferential flow gap in the Coanda area is not uniform. The irregularities in the circumferential gap are designed to reduce fish damage.

Another objective of the invention is to teach a Coanda effect pump where the irregularities in the circumferential flow gap are constructed and arranged to reshape the fluid flow for removing sea lice.

Still another objective of the invention is to teach a Coanda effect pump where over 30% of the fluid flow passes through the flutes.

Yet another objective of the invention is to teach a Coanda effect pump where over 40% of the fluid flow passes through the flutes.

Still another objective of the invention is to provide an improved pump wherein nearly 100% of the sea lice attached to a fish are removed.

Yet another objective is to provide an improved pump as part of the system described in Lindgren—U.S. Publication No. 2018/0206458 the contents of which is incorporated herein by reference.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
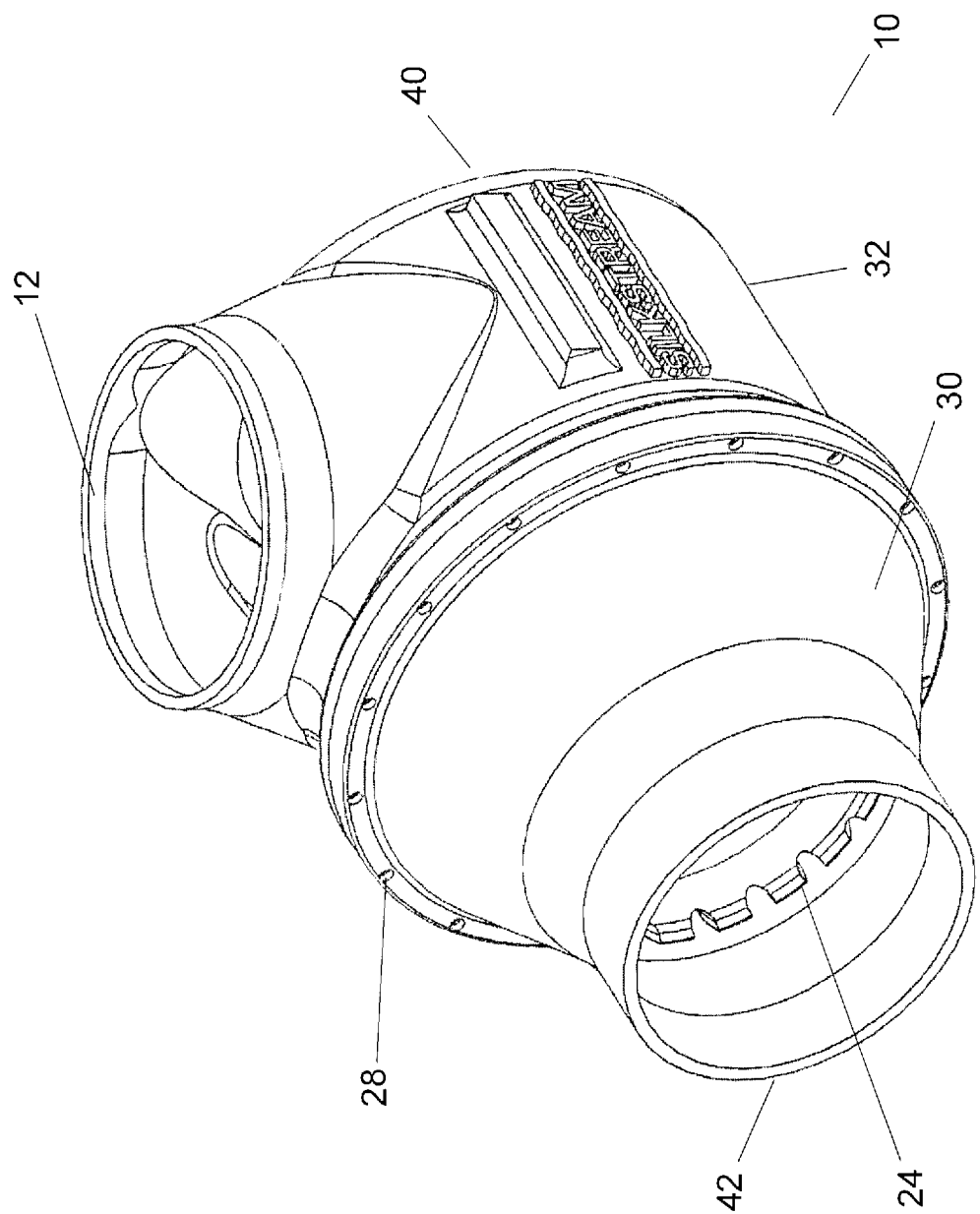
FIG. 1 is a perspective view of the improved pump.
Figures 2A, 2B:
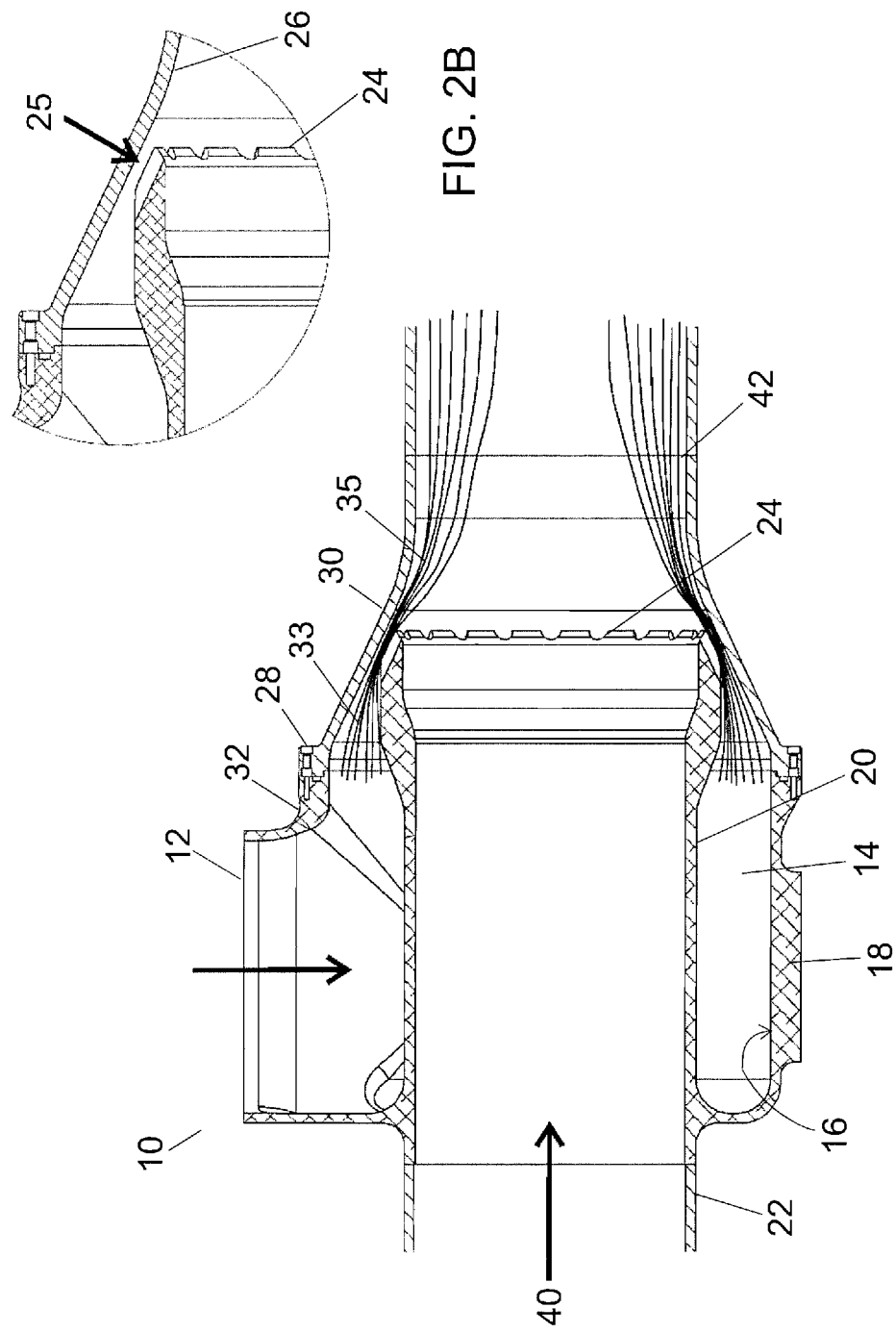
FIG. 2A illustrates fluid flow through the pump flow.
FIG. 2B is a cross sectional view of a circumferential gap cut through the flute area of FIG. 2A.
Figure 3B:
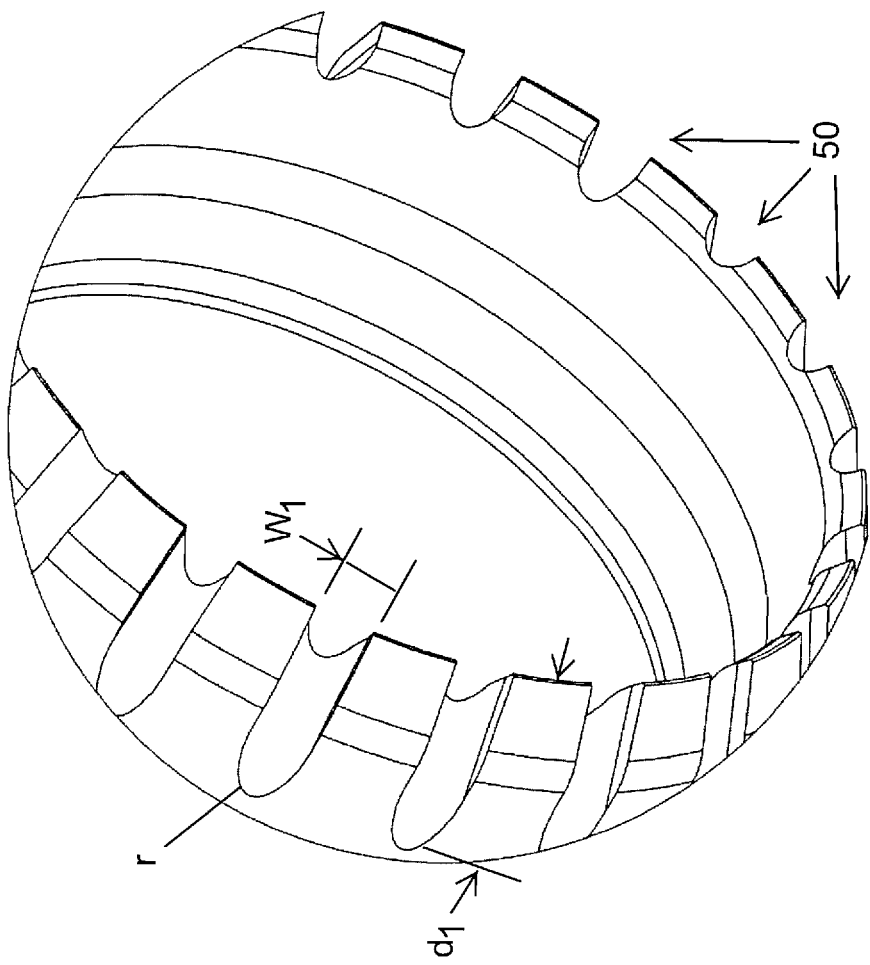
FIG. 3B is an enlarged view of a frontal flute section of FIG. 3A.
Figure 3A:
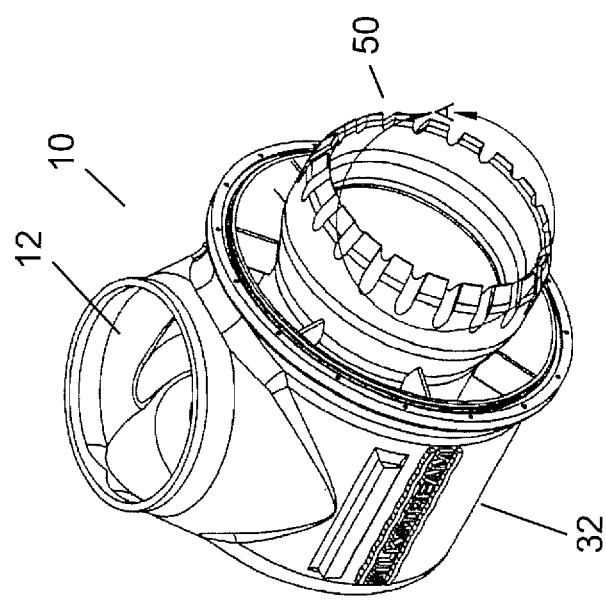
FIG. 3A is a perspective view of the pump depicted in FIG. 1 with the collector chamber removed.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1-4, illustrated is a ten inch Coanda effect fish pump 10 with desired efficiency and capacity improvements. By way of illustration, a flow of pressurized water enters the pump 10 through tube inlet 12 at a high velocity into a plenum 14, a concentric space formed between an outer wall 18 and an inner wall 22. In particular, the concentric plenum 14 is defined as the chamber formed between first surface 16 and second surface 20. The plenum 14 accepting water flow from the tube inlet 12 and providing a circumferential flow gap 25 that is formed between an end 24 of the inner wall 22 along the second surface 20 and an inner surface 26 of collector chamber 30. The collector chamber 30 is releasably secured to the housing 32 of the pump 10 by fasteners 28. The circumferential flow gap 25 between the collector chamber 30 at the end 24 of the inner wall 22 creates a suction along the fish inlet 40. Fish are pulled through the fish inlet and directed by the pump inner wall 22 which forms an interior water injection flow path. The fish are expelled through the fish outlet 42 along the end of the collector chamber 30.

For example, a ten inch pump commonly used on salmon fish requires approximately 2,000 GPM for a two meter lift, wherein the water through the fish inlet 40 will be approximately 1,500 GPM, and the pressurized water through the tube inlet 12 will be about 2000 GPM. A water stream, illustrated between numerals 33 and 35, will triple in velocity in less than four (4) inches. The change in velocity causes suction through the fish inlet 40. When salmon are drawn through the fish inlet 40 head first, the change in velocity has been found to be beneficial in the removal of sea lice. There are various ways to cause a fish to enter a suction pump head first, including the system set forth by Lindgren (U.S. Patent Publication No. 2018/0206458), and the use of special pumps like Lemmon, U.S. Pat. No. 4,193,737. A fish entering head first into the pump, as modified and described herein, will have nearly 100% of any sea lice attached to the fish removed.

The ten inch pump 10 has a primary water inlet 12 that is fluidly coupled to outlet 42 with the end 24 of the inner wall 22 providing a velocity change. The end 24 of the inner wall 22 includes a plurality of flutes 50 in the interior water injection flow path to more efficiently affect the water flow, and therefore improve lift and flow capacity.

The flutes 50 of the instant invention are positioned every 15 to 24 degrees. If positioned every 15 degrees, there will be twenty four (24) flutes. If positioned every 24 degrees, there will be fifteen (15) flutes. The flutes are constructed and arranged to flow a higher percentage of water through the flutes, allowing the flute modifications to adjust the pump water distribution. The resulting flow pattern is not only capable of removing up to 100% of the sea lice through a velocity change, the resulting flow pattern is less harmful to the fish than all known prior fish pumps.

Referring to the figures in general, it is known in the art that current fish pumps create undesirable, unsymmetrical pressure distribution at entrance, 0 degrees, and 180 degrees from velocity peak irregularities in the plenum at the respective angles. This is corrected by reducing the flute depth at those angles by 10-20% to balance the flow through adjusted flutes. This change of flute depth reduces irregularities and is less harmful to the fish physically, and reduces stress while the fish is traveling in the pump. It has been discovered that further adjusting the flutes from symmetry can adjust the flow pattern as desired. The increased depth of the flutes balances flow and decreases water from spinning when exiting the pump to minimize stress on the fish.

The instant invention reduces or eliminates the water entering the pump primary inlet 12 from spinning the fluid flow as it exits the collector chamber 30. The use of the circumferential flow gap allows a velocity change, but results in a fluid flow irregularities. Fish that are stressed after passing through a pump, typically such stress is induced by a spinning of the fish, can cause the fish to refrain from eating for days. For a ten inch pump, the improvement includes between fifteen (15) flutes and twenty-four (24) flutes. Each flute is about 0.625 inches wide "w" and over 0.5 inches deep "d" ending with 0.312 radius "r" and with the circumferential flow gap 25 spacing constructed and arranged to pass 40% or higher flow through the flutes 50. This design stops the spinning and reduces fish stress. The circumferential flow gap in the pump can be reduced to accommodate lift and proper flow. Water speed, rotation, swirl, and pressure changes constantly in a pumped flow system due to changes in flow direction, shape and surface conditions. Fish prefer to be upright and will stress and struggle, and often become damaged doing so trying to right themselves. An induced liquid flow is a reaction flow created by the low pressure area existing in the pump chamber, and is drawn into the pump through the fish inlet 40. The fish inlet 40, for the induced flow, is connected to a conduit (not shown) that can be into a body of liquid containing the fish or product to be transported. This conduit may be flexible for maneuverability. The velocity is directly related to the power of the primary intake and the degree of intermixing with the induced flow. By varying the flow profile around the circumferential flow gap and flutes, disruptions in flow can be corrected and controlled to improve fish condition and sea lice removal.

Applicant's U.S. Pat. No. 7,462,016, incorporated herein by reference, discloses a fish pump with flutes that were approximately 0.25 inch deep and 0.25 inches in radius. Sea lice can be removed by introducing salmon into the fish pump and providing a shear current past the fish from 2 to 5 meters per second. Variable flutes/scallops in the Coanda area of the pump allow performance that can accommodate shape and performance for different size fish and maximum sea lice removal.

OpenFoam software can accurately determine flow characteristics in a color format gauging speed, pressure and flow lines. FIGS. 5 to 8 depict water speed lines extracted from models from OpenFoam software ran on an Ohio State super computer to create displays showing how the uniform and unsymmetrical pump flutes modify disruption in flow from uneven pressures, or reshape the flow pattern for improving pump performance to remove sea lice. Laboratory pressures and flows confirm results. The lines represent water velocity flows as follows: Inside line 60 represents five meters per second; Center nine 62 represents nine meters per second; and the Outside line 64 represents twelve meters per second.

Figure 4B:
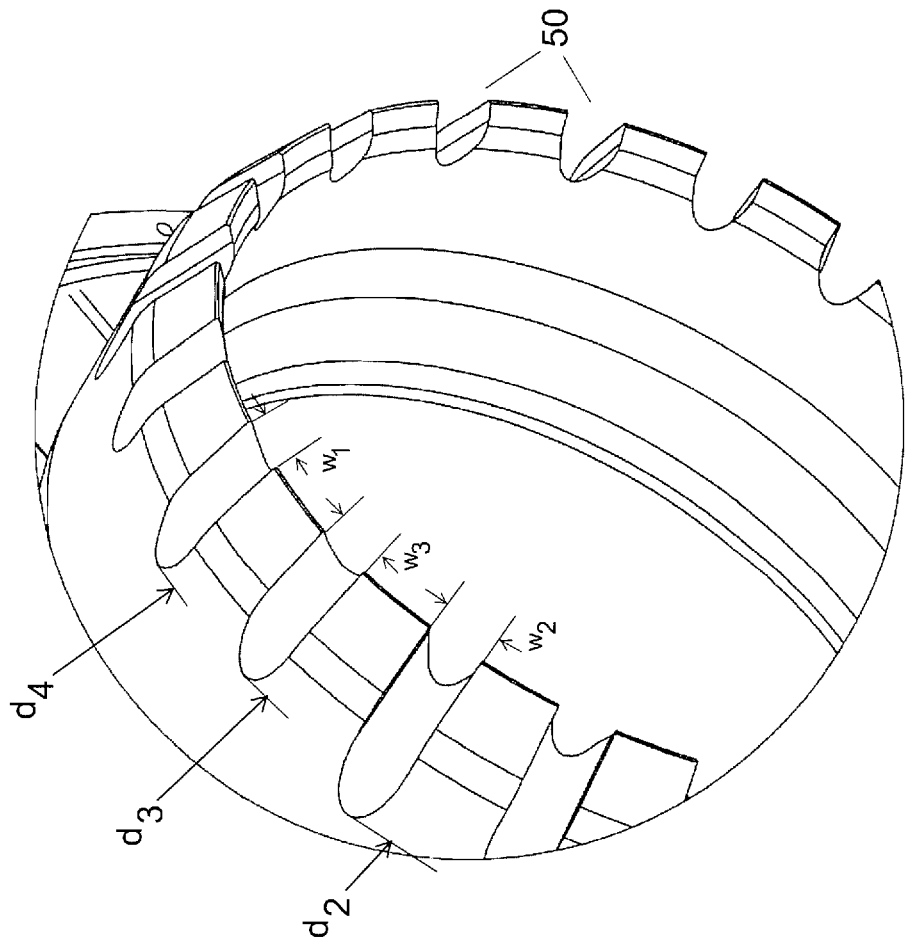
FIG. 4B is an enlarged view of an upper flute section of FIG. 4A.
Figure 4A:
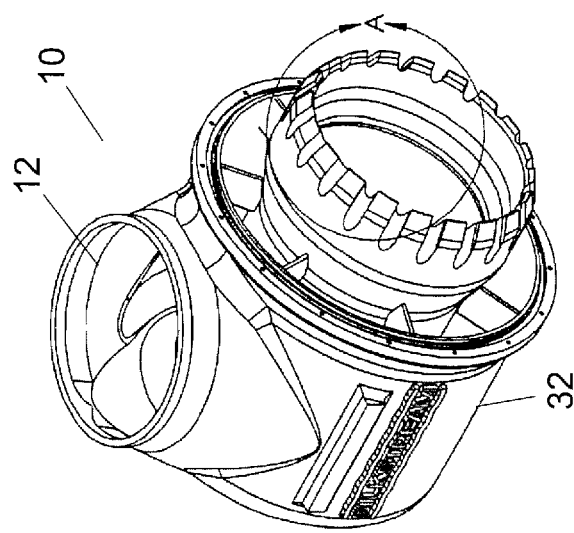
FIG. 4A is a perspective view of the pump depicted in FIG. 1 with the collector chamber removed.
Figure 5:
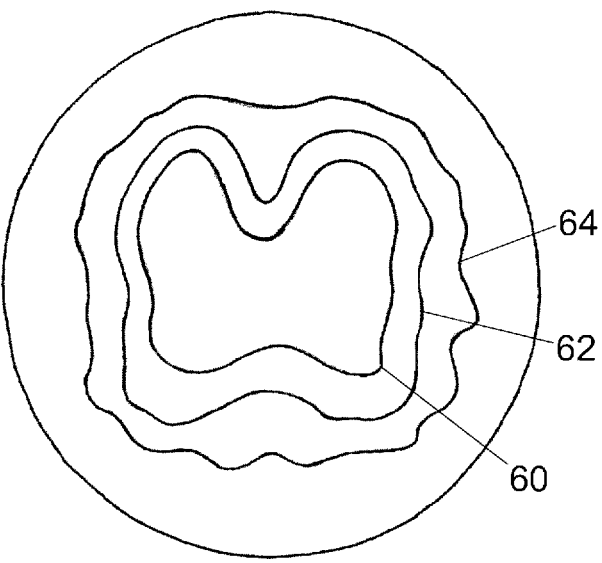
FIG. 5 illustrates velocity lines in a pump with twenty (20) identical flutes placed 18 degrees apart.

FIG. 4B displays flutes having different widths (W2, W3, W4) and different depths (d1, d2, d3). FIG. 5 displays constant velocity lines of a 10 inch pump modified with twenty (20) flutes 0.625 "w2" inches wide and 0.625 inches deep "d2", with a smaller gap to maintain constant primary pump flow for comparison. This is a more fish friendly pump, and there is still a higher velocity area at the top where the entrance water was introduced.

Figure 6:
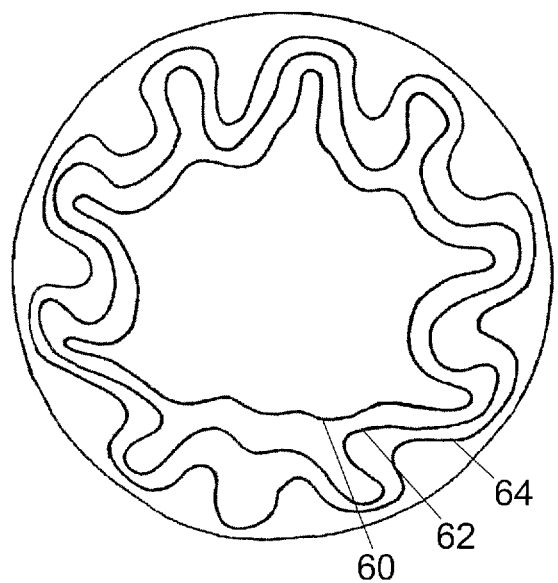
FIG. 6 illustrates constant velocity lines in a prior art pump having ten (10) identical flutes.

FIG. 6 illustrates constant velocity lines in a prior art 10 inch diameter pump having ten identical flutes, each spaced at 36 degrees 0.187" deep and 0.187" radius, as disclosed in U.S. Pat. No. 7,462,016. This pump was known to remove up to 70% of sea lice from salmon as the fish were pumped through the housing. This pump was also very good at improving lift because of the fast water introduced into the far water field downstream of injection. Velocity lines demonstrate an environment that can allow water spinning, and thus fish stress and damage.

Figure 7:
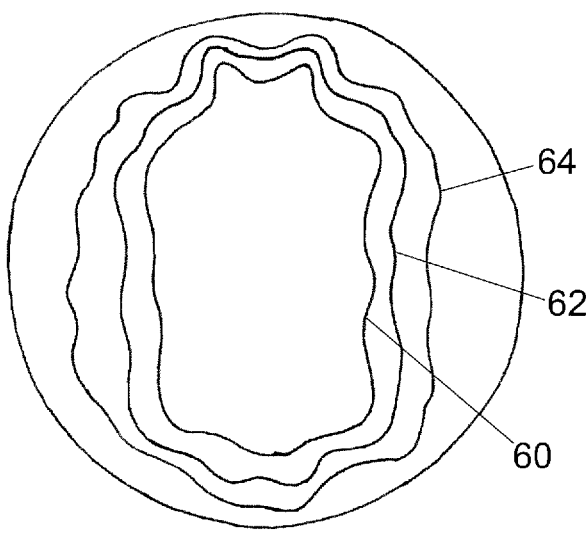
FIG. 7 illustrates velocity lines in a pump modified with unsymmetrical flutes at 0 and 180 degrees.

FIG. 7 displays constant water velocity lines for a modified 10 inch diameter pump with adjustments to 0.4" depth "d3" at the top (0 degrees) and bottom (180 degrees) using a 0.5" depth "d4" at 18, 172, 198, and 344 degrees further illustrated in FIG. 4B. This configuration more closely represents the profile of a fish passing upright during pumping. Positions that assimilate an adult fish passing help keep the fish in a predetermined position, thereby reducing irregularities and associated stress. There are other ways to adjust the pump flow unsymmetrical to achieve similar results with oval or curved shapes in the gap area.

Figure 8:
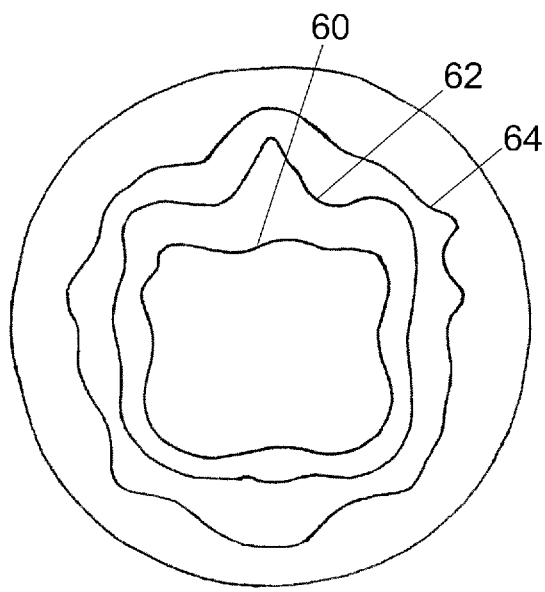
FIG. 8 illustrates velocity lines in a pump with flutes at 18, 172, 198, and 344 degrees.

FIG. 8 displays constant water velocity lines in a 10 inch diameter pump with the flutes at the top (0 degrees) and the bottom (180 degrees) reduced to 0.5 inches. This modification creates a nearly uniform velocity profile that can be changed with input primary water pressure to adjust for maximum fish output without fish damage.

The term "about" means, in general, the stated value plus or minus 5%. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternatives are mutually exclusive, although the disclosure supports a definition that refers to only alternatives and "and/or." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device that "comprises," "has," "includes" or "contains" one or more steps or elements, possesses those one or more steps or elements, but is not limited to possessing only those one or more elements.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A Coanda effect fish pump for transporting live fish by induced flow and removing sea lice from the live fish, said pump comprising
    a housing having a primary intake for primary flow, and a secondary intake for induced flow creating an interior water injection flow path terminating at a collector; said collector chamber for intermixing said primary flow and said induced flow, and an outlet for discharge;
    an orifice forming a circumferential flow gap having an irregular space between said primary intake and said collector chamber forming a flow path for said primary flow, said orifice including at least fifteen flutes each having a width and a depth define by spaced apart surface depressions formed along an end wall of the interior water injection flow path, said flutes are not all the same width and depth positioned to represent the profile of a fish with about 40% of said primary flow passing through said flutes and directing said primary flow at an acute angle to an axis defined by said induced flow;
    wherein said irregular space of said orifice and said flutes form an unsymmetrical gap to adjust water flow conducive to the removal of sea lice from fish.

2. The pump according to claim 1 wherein said pump intake diameter is ten inches and at least fifteen (15) said flutes are formed around said orifice.

3. The pump according to claim 1 wherein said pump intake diameter is ten inches and said orifice has between fifteen (15) and twenty-four (24) said flutes.

4. The pump according to claim 1 wherein said irregular space is constructed and arranged to reshape said intermixed flow to remove sea lice.

5. The pump according to claim 1 wherein said irregular space is constructed and arranged to reshape said intermixed flow to reduce fish damage.

* * * * *